(12) United States Patent
Houvener et al.

(10) Patent No.: US 6,397,194 B1
(45) Date of Patent: May 28, 2002

(54) RECEIPT SCANNING SYSTEM AND METHOD

(75) Inventors: Robert C. Houvener, Nashua; Ian P. Hoenisch, Salem, both of NH (US)

(73) Assignee: Image Data, LLC, Nashua, NH (US)

( * ) Notice: Subject to any disclaimer, the term of this patent is extended or adjusted under 35 U.S.C. 154(b) by 0 days.

(21) Appl. No.: 09/328,112

(22) Filed: Jun. 8, 1999

Related U.S. Application Data

(63) Continuation-in-part of application No. 08/967,768, filed on Nov. 10, 1997, now Pat. No. 6,202,055, which is a continuation-in-part of application No. 08/700,815, filed on Aug. 21, 1996, now Pat. No. 5,832,464, which is a continuation-in-part of application No. 08/436,146, filed on May 8, 1995, now Pat. No. 5,657,389.

(51) Int. Cl.$^7$ ............................................. G06F 17/60
(52) U.S. Cl. .............................. 705/16; 705/18; 705/50; 705/64
(58) Field of Search ................................. 705/1, 16, 17, 705/18, 50, 64, 75, 400

(56) References Cited

U.S. PATENT DOCUMENTS

| | | | |
|---|---|---|---|
| 5,120,906 A | | 6/1992 | Protheroe et al. ......... 178/18.05 |
| 5,448,044 A | | 9/1995 | Price et al. .................. 235/380 |
| 5,502,576 A | * | 3/1996 | Ramsay et al. .............. 358/444 |
| 5,561,282 A | | 10/1996 | Price et al. .................. 235/380 |
| 5,657,389 A | * | 8/1997 | Houvener ..................... 380/23 |
| 5,774,663 A | | 6/1998 | Randle et al. ............... 709/209 |
| 5,774,872 A | | 6/1998 | Golden et al. ................. 705/19 |
| 5,790,674 A | * | 8/1998 | Houvener et al. ........... 713/185 |
| 5,799,283 A | | 8/1998 | Francisco et al. ............. 705/19 |
| 5,832,458 A | | 11/1998 | Jones ........................... 705/14 |
| 5,832,464 A | | 11/1998 | Houvener et al. ............. 705/45 |
| 5,892,824 A | | 4/1999 | Beatson et al. .............. 713/186 |
| 5,910,988 A | * | 6/1999 | Ballard ......................... 705/75 |
| 6,032,137 A | * | 2/2000 | Ballard ......................... 705/75 |
| 6,040,783 A | * | 3/2000 | Houvener et al. ......... 340/5.53 |

FOREIGN PATENT DOCUMENTS

| | | |
|---|---|---|
| EP | 0822523 | 2/1998 |
| EP | 0831436 | 3/1998 |
| FR | 2595487 A * | 9/1987 |
| WO | WO9911021 | 3/1999 |
| WO | WO-00/75834 A2 * | 12/2000 |
| WO | WO-00/75884 A1 * | 12/2000 |

OTHER PUBLICATIONS

Langemo: "Sharper with imaging"; Office Systems, Apr. 1997, vol. 14, No. 4, pp. 26–33.*

* cited by examiner

*Primary Examiner*—Edward R. Cosimano
(74) *Attorney, Agent, or Firm*—Bourque & Associates, PA

(57) ABSTRACT

A transaction data processing system and method is provided, which is especially configured to capture, store and retrieve transaction data, including a digital representation of a signature of a person initiating a transaction. The transaction data processing system includes a scanner located at a point of use location. The scanner is configured to scan a transaction document including the signature of at least one party to the transaction. A transaction data processor is also included for processing the scanned transaction data and for generating a transaction data record. A remote database site having stored therein a database of transaction data records is also provided. A communications link links the remote database site to the transaction data processor, which is located at the point of use location. The method includes the steps of: scanning a document related to a financial transaction, said document at least a signature of at least one party to the transaction; processing the scanned document and generating a transaction data record; linking the transaction data processor to a remote database site; transmitting each generated transaction data record to the remote database site; and storing each transmitted transaction data record in a transaction data record database.

4 Claims, 6 Drawing Sheets

RECEIPT SCANNING SYSTEM AND METHOD

RELATED APPLICATIONS

This is a Continuation-in-Part of application Ser. No. 08/967,768, filing Date Nov. 10, 1997 now U.S. Pat. No. 6,202,055, issued Mar. 13, 2001, which is a Continuation-in-Part of application Ser. No. 08/700,815, filing Date Aug. 21, 1996 now U.S. Pat. No. 5,832,464, issued Nov. 3, 1998, which is a Continuation-in-Part of application Ser. No. 08/436,146, filing Date May 8, 1995 now U.S. Pat. No. 5,657,389, issued Aug. 12, 1997.

FIELD OF THE INVENTION

This invention relates to data processing system, and, more particularly, to a system and method of scanning and storing transaction documents bearing the signature of at least one party to the transaction. In one preferred embodiment the system and method is used to scan financial transaction/authorization documents, including retail sales receipts bearing retail sales purchaser signatures, and transmitting and storing information obtained off of the documents electronically at a remote database site.

BACKGROUND OF THE INVENTION

Over the last 20 years, credit cards have gained widespread acceptance as a means of paying for goods and services. If the customer is not paying cash for a transaction but instead is charging the transaction cost to a credit card or bank account, a retailer typically may require the customer to sign a charge slip as evidence that the customer is who he says he is and actually purchased or received the goods or services. Retailers commonly save and file these signed paper receipts, and, as will be more fully explained below, forward them upon request to a credit card company or other financial institution as evidence of the transaction.

In order for a credit card transaction to be processed, a merchant must collect a variety of data associated with the transaction. This data typically includes the purchase price and date of the transaction, the account number and expiration date of the credit card, and the cardholder's name and signature. Once this data is collected, the merchant transmits the transaction data, along with its merchant identification code, to a credit card transaction processor. The credit card processor sorts the data according to the company that issued the credit card, and forwards the data to the appropriate company. At that point, the credit card issuer posts the transaction to the cardholder's account and the purchase amount is credited to the merchant. The credit card processor facilitates the flow of information and funds between merchants and credit card issuers.

Formerly, credit card transaction data was recorded, transferred, and stored in the form of paper receipts. Over the years, the credit card industry has developed various types of equipment that provides for the electronic acquisition, transmission, and storage of transaction data. In addition to reducing the industry's reliance on paper records, this equipment expedites the processing of credit card transactions and minimizes errors associated with the entry of transaction data. The equipment includes point-of-sale (POS) equipment used by merchants and computer systems used by credit card processors.

Most merchants employ a cash register system of some type in order to record data associated with transactions, regardless of whether payment is made with cash, check, or credit card. In addition to a cash register, merchants that accept credit cards use other POS equipment to collect data associated with the credit card. This equipment usually includes electronic terminals that read the account number and expiration date from a magnetic stripe on the credit card and transmit the transaction data to the credit card processor. Such equipment may be separate from, or integrated into, the cash register equipment.

In a typical credit card transaction, a cardholder presents a credit card to a merchant, who records transaction data using an electronic terminal. The recorded data includes the amount of the purchase, the cardholder's account number, the card's expiration date, the merchant identification number, and the date of the transaction. In most cases, the cardholder is also required to sign a copy of the receipt.

Once the terminal accumulates the transaction data, the terminal automatically dials the merchant's credit card processor or other authorization source and initiates an authorization request. When the transaction is authorized, the terminal displays and/or stores the approval code or authorization indicia received from the credit card processor. The approval code is recorded along with the other transaction data. The POS equipment typically includes a printer that is capable of printing a sales receipt. The sales receipt includes the transaction data and approval code, and provides a space for the cardholder's signature.

These prior art devices allow numeric data, such as purchase price, date, account number, and merchant identification number to be easily accumulated, stored, and transmitted between the merchant and credit card processor. Consequently, numeric transaction data may be transferred and stored without the use of paper receipts. Although this numeric data is sufficient to process the transaction, it may be insufficient to validate or authenticate a transaction that is disputed by the cardholder. In the event a cardholder questions or denies the legitimacy of a transaction that appears on his or her credit card statement, it may be necessary for the merchant to produce a copy of the signed receipt as evidence that the cardholder was a party to the transaction. Therefore, it is necessary that a copy of each signed receipt be retained by the merchant for some period of time.

However, the handling of signed paper receipts as evidence of a transaction has also become a significant problem. For some time now retailers and the acquiring banks have been concerned with the cost in time and effort associated with dealing with the "request for copy" process. The process starts when a customer, not recognizing an item on his monthly credit card statement, calls his issuer to query the charge. The credit card company rules define the further procedures as follows:

(a) the customer account is credited temporarily pending investigation;

(b) the acquiring bank (or merchant bank) is debited pending investigation;

(c) the retailer is asked by the acquiring bank to produce a copy of the sales slip with the customer's signature on it (about 30% of these slips are not produced by the retailer);

(d) if the retailer cannot produce a sales slip with a valid or legible signature he loses the revenue from the transaction. If the signature is fraudulent, either the card issuer or the retailer stands the loss;

(e) if the retailer produces a valid transaction record, the charge is reinstated in the customer's account and the acquiring bank is once more credited with the transaction value.

About 0.4% of all credit card transactions are challenged in this manner. With the paper-based "signature on file" process, each investigation can drag on for about four weeks before a resolution is reached. The acquiring bank is out of pocket during this period to the extent of the value of the transaction and expends valuable time attempting to resolve the dispute. Recent rules have been introduced by Visa and MasterCard which cause the issuers to provide a strong financial incentive to the acquirers to respond quickly to retrieval requests.

The retailer, in order to service the request for copy efficiently, often installs expensive microfilm systems and is asked to keep copies for up to three years. To service each request someone must physically search out the copy and regenerate an image of the transaction. If the retailer does not install such equipment it is estimated that on an average of up to 30% of the copies cannot be found and the retailer loses the sale revenue under these circumstances. In order to prepare for requests for copy and to reconcile the credit card transactions with the register audit tape, all systems generate an extra copy of the transaction details which are reconciled and batched for processing each day. All this effort is quite costly to the retailer.

This process of retaining and retrieving signed receipts is simplified if the merchant employs POS equipment that allows the cardholder's signature to be digitized, transmitted, and stored along with the numeric data associated with the transaction. In such cases, the signature is digitized as the cardholder signs the credit card receipt. The digitized signature data and numeric transaction data are combined and transmitted to the credit card processor, where the data is stored for a predetermined period of time. If a cardholder disputes the validity of a transaction, the entirety of the transaction data, including a facsimile of the signature, may be provided by the credit card processor, and may serve as evidence of the legitimacy of the transaction.

Such types of POS equipment include electronic signature capture systems, which are in use today by large retail merchants. Typically, when using such devices, a receipt or application form is placed on the signature terminal so that the signature line is presented to the customer. A special attached pen is provided which allows the signature to be captured electronically at the same time it is written in ink. Thereafter the original signed receipt is given to the customer who leaves with the only piece of paper in the system. Everything else has been captured electronically in a simple efficient format that can be electronically stored with the associated electronic document data. This allows for later communication to a corporate host computer or acquiring bank and easy reproduction on a laser printer.

Some of these signature terminals include the capability to verify the submitted signature at the point of service. However, currently the driving force behind the largest application of signature capture devices is the retailers' desire to eliminate the mountains of paper which they currently store to satisfy queried credit card transactions and to minimize the probability of "losing" the receipts (and hence the transaction revenues) from these queried transactions. Large retailers installing signature capture terminals have typically generated paybacks of less than one year from the savings associated with this type of investment. On the other hand, for smaller retail establishments, the initial expense associated with implementing signature capture systems has made their widespread implementation cost prohibitive.

In addition, many merchants have invested significant amounts of money in POS equipment, such as sophisticated electronic cash registers, that allows the merchant to collect all of the numeric data associated with credit card transactions. In the case of larger merchants, the POS equipment may be connected to a merchant's accounting computer system or "in-store processor" via a data communications network in order to facilitate the merchant's business operations. Although it may be advantageous to capture signatures in such cases, it is not cost effective or convenient to do so if it is necessary to add additional printers or terminals that duplicate the merchant's existing capabilities.

Furthermore, a merchant's existing POS equipment may be connected to peripheral devices, such as check readers for automatically reading checking account data and PIN pads, which are used to input a debit card user's personal identification. number (PIN). The existing POS equipment may not provide sufficient communications ports to allow the merchant to connect additional peripheral devices.

Finally, as indicated earlier, some retailers attempt to "authenticate" the customer's signature at time of transaction by visually comparing it with a presumed authentic signature on the back of the credit card and/or on a photo ID such as a driver's license. Thus, the store clerk makes a quick visual comparison between (a) a presumed-to-be-authentic signature presented by the customer, and (b) the signature the customer created on a paper charge slip in the presence of the store clerk.

This "authentication" technique may sometimes be successful in detecting amateur thieves, but has severe limitations that make it totally ineffective against any serious and/or intelligent thief. For example, a thief can easily avoid detection by simply practicing the signature to be forged beforehand—since store clerks' typically are not skilled in the art of handwriting comparison. Skillful thieves can distract the store clerk with small talk or compliments—thereby effectively destroying the effectiveness of any visual handwriting comparisons. Moreover, many store clerks (especially those faced with a long line of anxiously waiting customers) may not be willing to take the time to make a careful visual signature comparison. Still further, a thief can destroy the reliability of the entire visual inspection handwriting authentication process by presenting his own handwritten signature of an alias name as the presumed-to-be-valid signature for comparison purposes. People sometimes do not sign the backs of their credit cards as they are supposed to, and a thief can easily write the credit card owner's name in the thief's own handwriting on the back of an unsigned card—which the thief can of course easily reproduce on demand on a paper charge slip. Professional thieves sometimes also forge photo IDs—completely bypassing efforts to detect fraudulent transactions based on visual handwriting comparison. In addition, store clerks very seldom study the hand-written signature on the back of the card and there is thus little chance of detecting the use of a lost or stolen card.

Thus, a number of sophisticated systems have been developed, which are all aimed at verifying the identity of an individual at a point of sale location. One such system is described in commonly owned U.S. Pat. No. 5,657,389, the disclosure of which is fully incorporated herein by reference. In short, the '389 Patent provides a system and method of positively identifying individuals, which includes at least one remote database site having stored therein digital photographic images of persons to be identified. Upon a request placed from a point of identification terminal, account information is accepted and transmitted to the remote database site, where the account information is correlated to one or more digital photographic images of persons authorized to use the account. The digital photographic images are then transmitted to the point of identification terminal where they are displayed on a display device. The clerk then compares the displayed digital photographic image(s) with the physical appearance of the person presenting the non-cash financial instrument and indicates that a match exists by entering a validation input into the point of identification terminal. The validation input includes information that identifies the clerk processing the transaction. The transaction information along with the identifying information for the customer and the clerk are then stored in transaction records at the remote database site.

Accordingly, it would be especially advantageous to provide a system and method of capturing and storing digital representations of retail store receipts, which include signatures of purchasers, that is compatible with all existing types of POS hardware. It would also be especially advantageous if such a system were compatible with a positive identification system, such as the one disclosed in the above-mentioned '389 Patent, such that a single device may be put to multiple uses.

SUMMARY OF THE INVENTION

A data processing system and method is provided, which in one application is especially configured to capture, store and retrieve transaction document's, including retail store receipts and electronic funds transfer (EFT) authorizations, which include a digital representation of a signature of a person initiating the transaction. In one embodiment, the system is used in conjunction with a point of sale system, which is used to process non-cash financial transactions, such as credit card purchases, check-initiated EFTs and the like. The data processing system includes a scanner located at a point of use location, such as a point of sale. The scanner is configured to scan a transaction document, which at least includes a signature of the person initiating the transaction.

The system also includes a transaction data processor for processing the scanned transaction document and for generating a transaction data record. Also included in the system is a remote database site having stored therein a database of transaction data records.

A communications link links the remote database site including the transaction data record database to the transaction data processor, which is located at the point of use.

Also provided is a method of processing transaction data, which is especially tailored to facilitate the capture, storage and retrieval of financial transaction data, including a digital representation of a signature of a person initiating a financial transaction. The method begins by scanning a document related to a transaction, said document including at least a signature of a person initiating a transaction, such as a non-cash financial transaction. The scanned transaction data is then processed and a transaction data record is generated by a transaction data processor. Next, the transaction data processor is linked to a remote database site including a transaction data record database over a communications link.

The transaction data record(s) generated by the transaction data processor are then transmitted to the remote database site, where they are stored in the transaction data record database.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
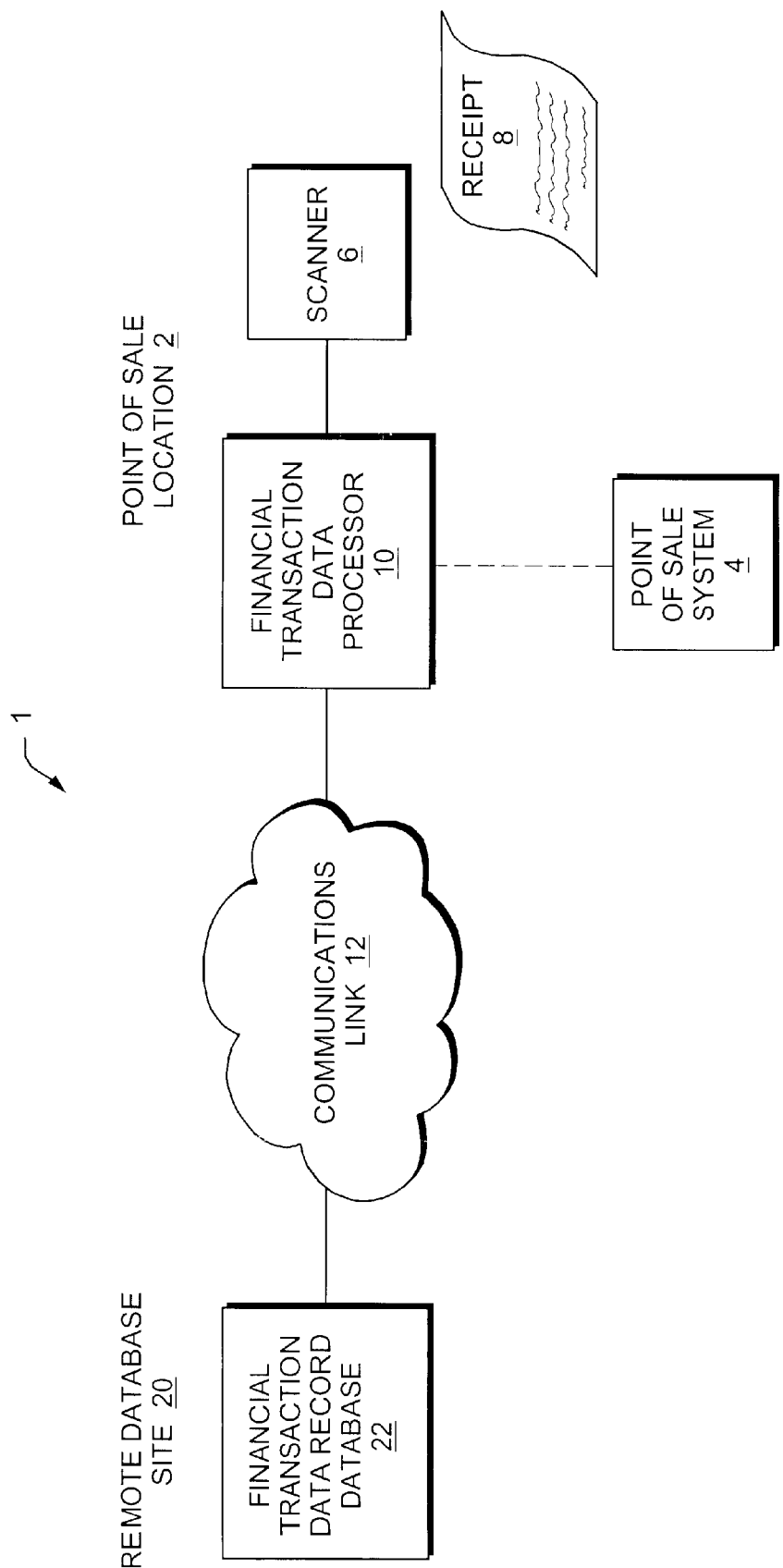
FIG. 1 is an overall block diagram showing the components of a financial transaction data processing system according to the teachings of the present invention.

FIG. 1 shows a data processing system 1, which is especially configured to capture, store and retrieve transaction data according to the teachings of the present invention. In particular, the transaction data sought to be captured includes at least a digital representation of a signature of at least one person to a transaction.

Although the following description will make specific references to credit card-based retail transactions and credit card receipts, this is but one example of a use of the disclosed system and method. The principles of the invention are equally applicable to other non-cash initiated financial transactions, such as check-initiated transactions that are converted to EFTs at a point of sale location. In fact, any transaction where a transaction/authorization document bearing the signature of the person initiating the transaction would be a likely use for the disclosed system and method. Such alternate uses include attendance verification, service receipt verification, package receipt verification and countless other applications where a signed transaction document is created. Accordingly, the following description should not be read as a limitation of the invention, but as an example of a type of transaction that would benefit from the applicant's invention.

The transaction data processing system includes a transaction data scanner 6, which is located at the point of use 2, such as a point of sale location. The transaction data scanner 6 is configured to scan at least a document 8 generated at a point of use location such as a retail receipt. The receipt or other document 8 may be generated by a point of sale system 4. However, as will become more apparent below, the principles of the present invention are equally applicable to manually generated receipts as well as other documents.

Since the system of the present invention is especially useful in streamlining the request for copy process described earlier, the document 8 must at least include a signature of the person initiating the financial transaction. In addition to the person's signature, in a retail situation, the receipt 8 may also include printed financial transaction data, such as information identifying the merchant, the nature of the transaction, such as a product or service purchased, the date of the transaction, the dollar amount of the transaction and other information useful in facilitating the processing of a credit card of other financial account-initiated transaction.

The data processing system 1 also includes a transaction data processor 10, also located at the point of use location 2. The transaction data processor 10 is configured to process transaction data into a transaction data record.

The system 1 also includes a communications link 12, which links the point of use location 2, including the transaction data processor 10, to a remote database site 20. The remote database site includes at least one database including a database of transaction data records 22, generated by the transaction data processor 10 at the point of use location 2 and communicated to the transaction data record database 22 at the remote database site 20 over the communications link 12.

Figure 2:
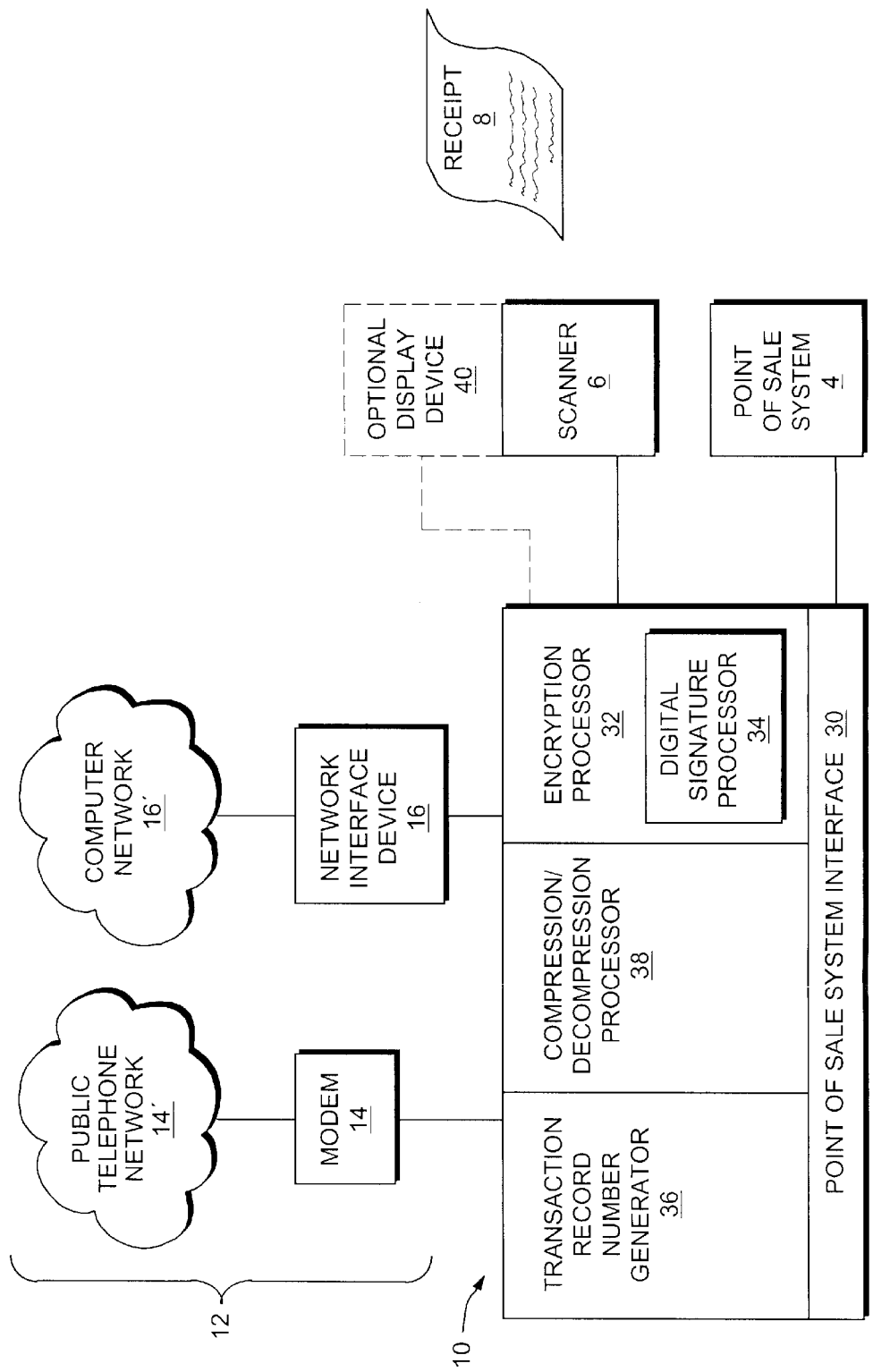
FIG. 2 is a more detailed block diagram showing the components of the financial transaction data processing system of FIG. 1 that are located at a point of sale location.

FIG. 2 shows, in more detail, the components of one embodiment of the transaction data processing system 1, which is especially adapted for use in conjunction with a retail transaction at a point of sale. The data processing system 1 includes a specially configured transaction data processor 10, which is located at a point of sale location 2. In this embodiment, the transaction data processor 10 includes a point of sale system interface 30, which interfaces the transaction data processor 10 to a point of sale system 4. In this regard, information regarding a particular financial transaction, such as the account number to which the transaction will be charged, the amount of the transaction, the identity of the merchant, the date of the transaction, etc., which are all generated by typical prior art point of sale systems, can be provided to the transaction data processor 10 from the point of sale system 4. Thus, all this pertinent financial transaction data can be merged by the transaction data processor 10 with at least one piece of information scanned off of a receipt 8 by the transaction data scanner 6 and included in a financial transaction data record.

In one embodiment, the communications link 12 may include a modem 14, which interfaces the transaction data processor 10 to the remote database site 20 over the public telephone network 14'. In the alternative, a network interface device 16, which may be a WAN (Wide Area Network) device or a LAN (Local Area Network) device, may be utilized as the communications link to link the transaction data processor 10 to the remote database site 20 over a computer network 16'. In one embodiment, the network 16' may include a local area network, which would be used in connection with larger system users who would process sufficient transactions to have its own remote database site. "Remote" in this situation would mean separated from the point of use terminal. However, it would be connected to each point of use terminal over a LAN. In another embodiment, which would be tailored to smaller system users, the remote database site would be truly "remote" from the user's premises and would be connected thereto over a WAN. In this embodiment, multiple system users would use a single remote database site. The WAN may be national in scale or even comprise a global computer network.

Figure 3:
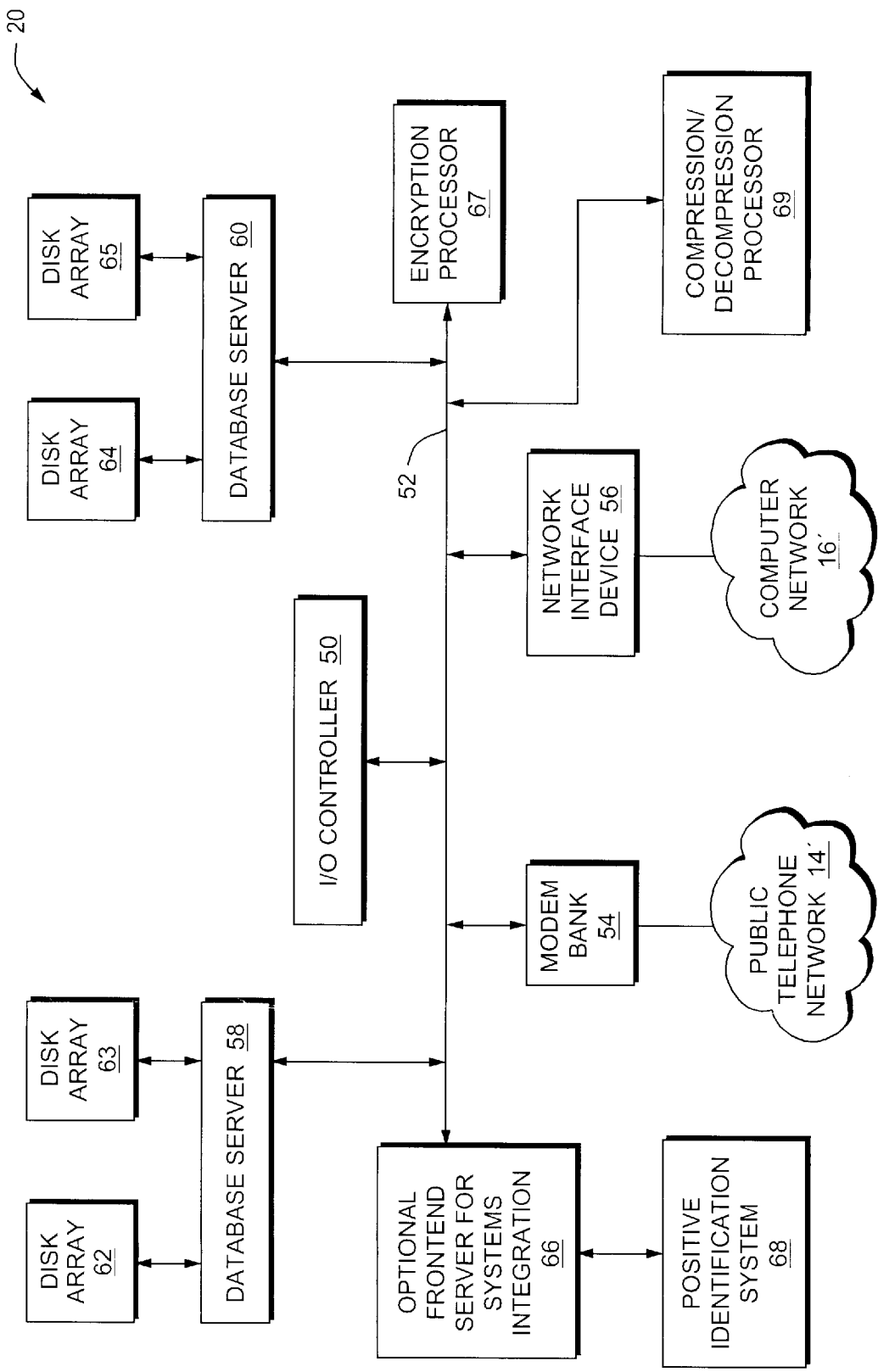
FIG. 3 is a more detailed block diagram showing the components of the financial transaction data processing system of FIG. 1 that are located at a remote database site.

In another embodiment of the invention, the transaction data processing system 1 may include an encryption processor 32 located at the point of use location 2. The encryption processor 32 may be an integral component of the transaction data processor 10 or it may be a separate, stand alone unit. The encryption processor 32 is configured to encrypt each transaction data record created by the transaction data processor 10 prior to transmitting the transaction data record from the transaction data processor 10 to the transaction data record database 22 at the remote database site 20. As is shown in FIG. 3, which will be more fully explained below, the remote database site may also have an encryption processor 67, for decrypting transaction data records at the remote database site 20.

In one preferred embodiment, the encryption processor 32 includes a digital signature processor 34 for attaching a digitally signed data element to each transaction data record before it is transmitted to the remote database site 20 over the communications link 12. In this manner, each transaction data record created by the transaction data processor 10 may be checked for origin and authenticity at the remote database site 20.

The transaction record data processor 10 may also include a transaction number generator 36. The transaction record number generator will generate and attached a unique transaction record number for each transaction data record created by the transaction record data processor 10. The transaction number attached to each transaction data record can be utilized by the system in order to retrieve transaction data records regarding transactions that are questioned at a later date.

The transaction data processing system 1 may further comprise a compression/decompression processor 38 at each point of use location 2. The compression/decompression processor 38 would compress each transaction and data record generated by the transaction data processor 10 prior to transmitting the transaction data record from the transaction data processor to the remote database site. As will be more fully explained below, each transmitted transaction data record may be stored in the transaction data record database 22 at the remote database 20 in the compressed state or, may be decompressed using a similar compression/decompression processor 69 (FIG. 3) at the remote database site 20.

The transaction data processing system 1 may further include a display device 40 at each point of use location 2. The display device 40 would be configured to display information scanned by the scanner 6 as well as information transmitted from the remote database site 20 to the point of sale location 2. The display device may be integral with the scanner 6 unit. In the alternative, the display device 40 may be a separate, stand alone unit, such as the display device of the '389 Patent. The display device may also be a component of the point of sale system 4, which is driven by the transaction data processor 10 to display scanned receipts and/or financial transaction data records, as well as additional information.

FIG. 3 shows the components located at the remote database site 20, which are used to implement the transaction data record database 22. In order to establish communications with the remote database site 20, the remote database site includes an input/output controller 50 via a modem bank 54 or WAN device 56, which interface public telephone network 14' or wide area network 16', respectively. In one embodiment, in order to provide security to the transaction data processing system, the controller 50 may initiate a query to the transaction data processor 10 (FIG. 1) to verify that the transaction data processor has the appropriate authority to access the remote database site 20 and is a valid/authorized device. One simple and cost effective method of performing this query is to use commonly available caller ID technology to ensure that the request for data has originated from an authorized telephone line. This method would be available if the communications link 12 (FIG. 1) linking the transaction data processor 10 to the remote database site 20 comprises the public telephone network 14'. However, additional embodiments may utilize a software key incorporated into each transaction data processor 10, as is more fully explained in commonly owned U.S. Pat. No. 5,790,674, which issued Aug. 4, 1998 and which is incorporated herein by reference.

Once controller 50 verified that the transaction data processor 10 is a valid device and has the appropriate access privilege, the transaction data processor 10 will transmit a transaction data record to the remote database site 20. The transmitted transaction data record(s) are received by the input/output controller 50 over a high speed network 52. The high speed network may be fiber distributed data interface (FDDI), asynchronous transfer mode (ATM) or any other suitable cost effective high speed network. Each transaction data record will then be routed to one of a number of database servers 58–60, where the transaction data record will be processed. The selected server would then access a set of high speed, high reliability disk arrays 62–65. The remote database site may further include an optional front-end server 66, which would be capable of integrating the transaction data processing system 1 of the present invention with additional sales transaction-related systems, such as the positive identification system described in the '389 Patent.

In this embodiment, the remote database site 20 would further include a database of digital photographic images of authorized users of financial accounts, such as the digital photographic image database described in the '389 and '055 Patents, which are incorporated herein by reference. In this embodiment, the optional front-end server 66 would include a database processor for retrieving a financial account number from a financial transaction data record transmitted to the remote database site from the transaction data processor 10. The database processor would then retrieve, at least one digital photographic image of at least one authorized user of the pertinent financial account from the positive identification system 68. The database processor would then transmit the retrieved digital photographic image(s) to the point of sale location 2 via input/output controller 50 and communications link 12 where the digital photographic image(s) would be displayed on the display device 40 (FIG. 2) at the point of sale location 2.

Figure 4:
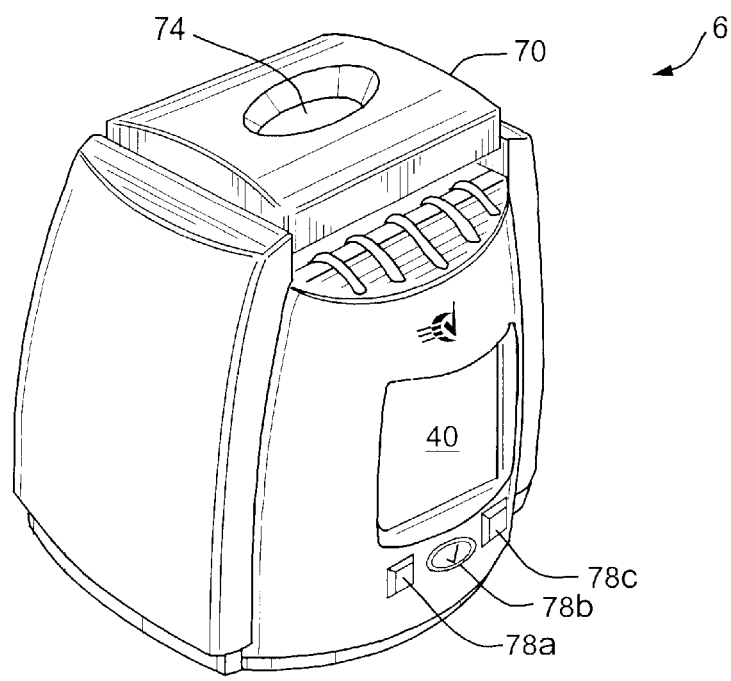
FIG. 4 is a perspective view of one embodiment of a financial transaction data scanner according to the present invention.
Figure 5:
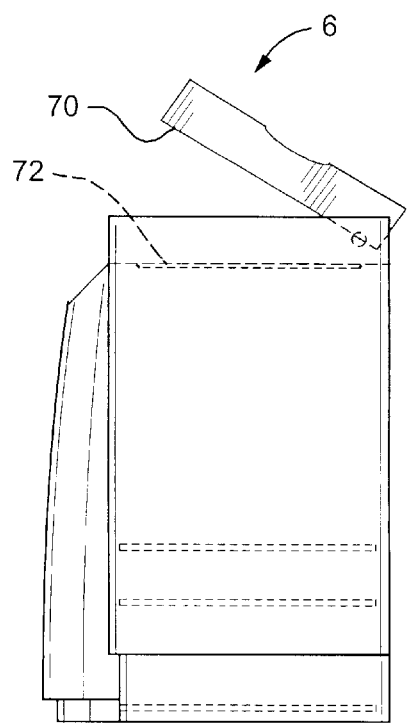
FIG. 5 is a side view of the financial transaction data scanner of FIG. 4.

FIGS. 4 and 5 show one embodiment of a transaction data scanner 6 according to the teachings of the present invention. The scanner 6 would include well-known scanner technology capable of capturing character-based data as well as image data. The invention contemplates the use of any technology capable of capturing both image and textual data, such as the standard charge coupled device (CCD) image capture devices and low cost complimentary metal oxide semi-conductor (CMOS) cameras. In this manner, a "snap shot" can be taken of a sales receipt 8 or any other transaction document inserted into one or more scanner input. The scanner 6 includes a cover 70, which is preferably hinged to provide access to a scanner input platen 72. The cover 70 would preferably include a window 74 through which a receipt 8, other transaction or identification document being scanned would be visible so as to preclude system users from inadvertently leaving such a scanned document in the scanner 6 after the scan is complete.

The scanning operation could be initiated using a microswitch or other pressure sensitive switch (not shown) which would activate the scanner when a system user depresses the scanner cover 70. As indicated above, the scanner 6 may also include an optional display device 40, which would preferably be a miniature flat panel (LCD) display. Preferably, the display panel 40 would be adjustable to allow the display to be viewed comfortably at different angles. The display device 40 could be utilized to preview a scanned image before transmitting the same to the remote database site 20. In this embodiment, the scanner 6 would include one or more input buttons 78*a*, 78*b*, and 78*c*, which would be utilized by a system user in operating the system. For example, a transmit button 78*b* would be provided to transmit a transaction data record, including information scanned by the scanner 6 provided the scanned information preview appears acceptable to the system user. In additional embodiments, such as when the scanner 6 is utilized in conjunction with a positive identification system, the display panel 40 may also display digital photographic image data pertinent to particular transactions. In this embodiment, additional user input keys, such as a scroll key 78*a* or any other suitable user input keys 78*c* may be provided.

As indicated in the '055 Patent, the scanner 6 may be utilized for scanning identification information as well, such as driver's licenses, passports, and other identification instruments. Such scanned identification information can be transmitted to the remote database site where it could be processed and stored in one or more identification database. The scanner 6 would also be capable of scanning other financial instruments, such as checks and the like such that a single scanner 6 may be utilized in connection with other financial processing systems, such as the system for efficiently processing payments via electronic funds transfer described in commonly owned U.S. Pat. No. 5,832,464, which is incorporated herein by reference.

Figure 6A:
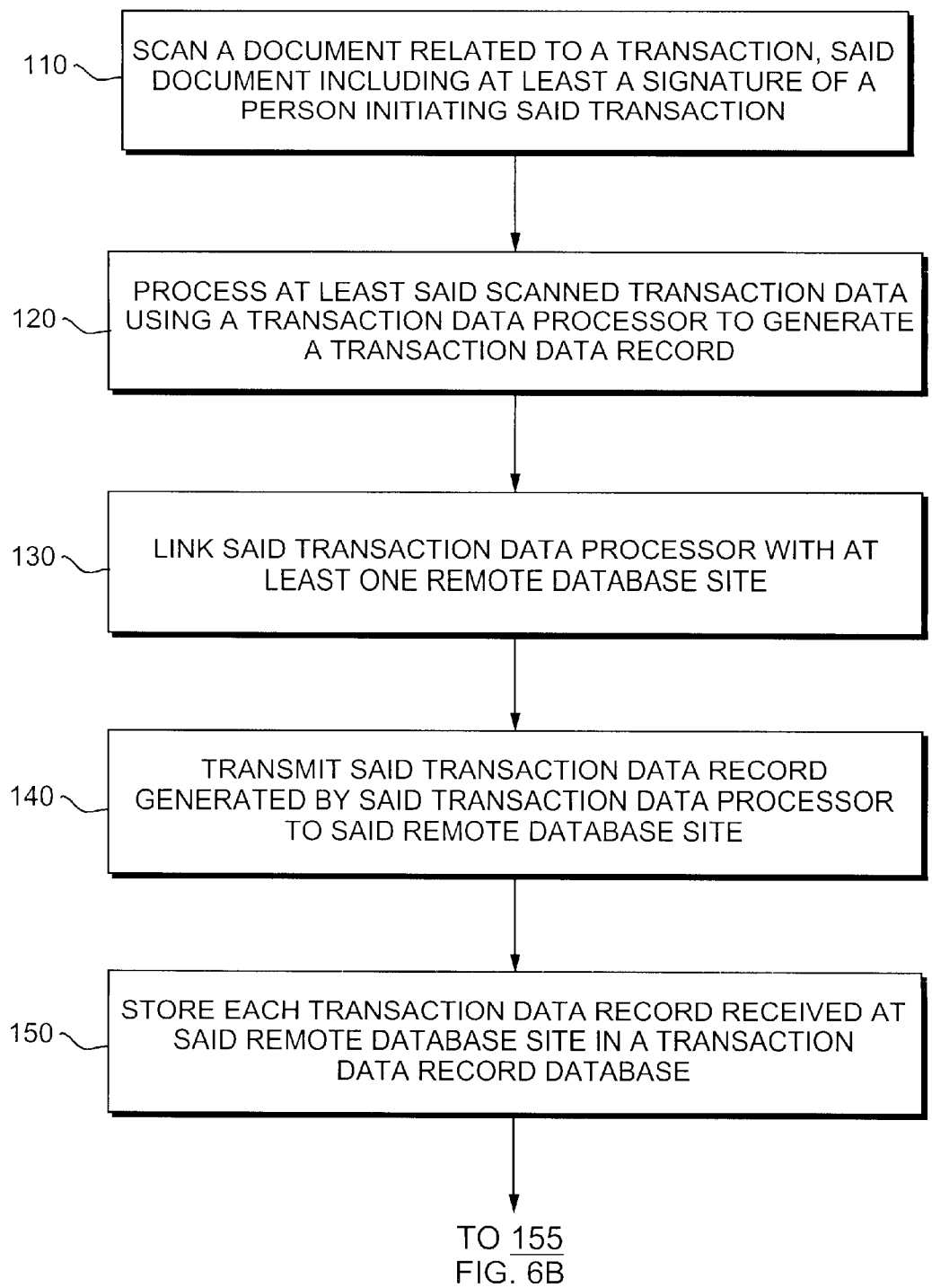
FIGS. 6A and 6B provide a flow diagram showing a method of processing financial transaction data, especially tailored to facilitate the capture, storage and retrieval of financial transaction data, including a digital representation of a signature of a person initiating a financial transaction according to the present invention.
Figure 6B:
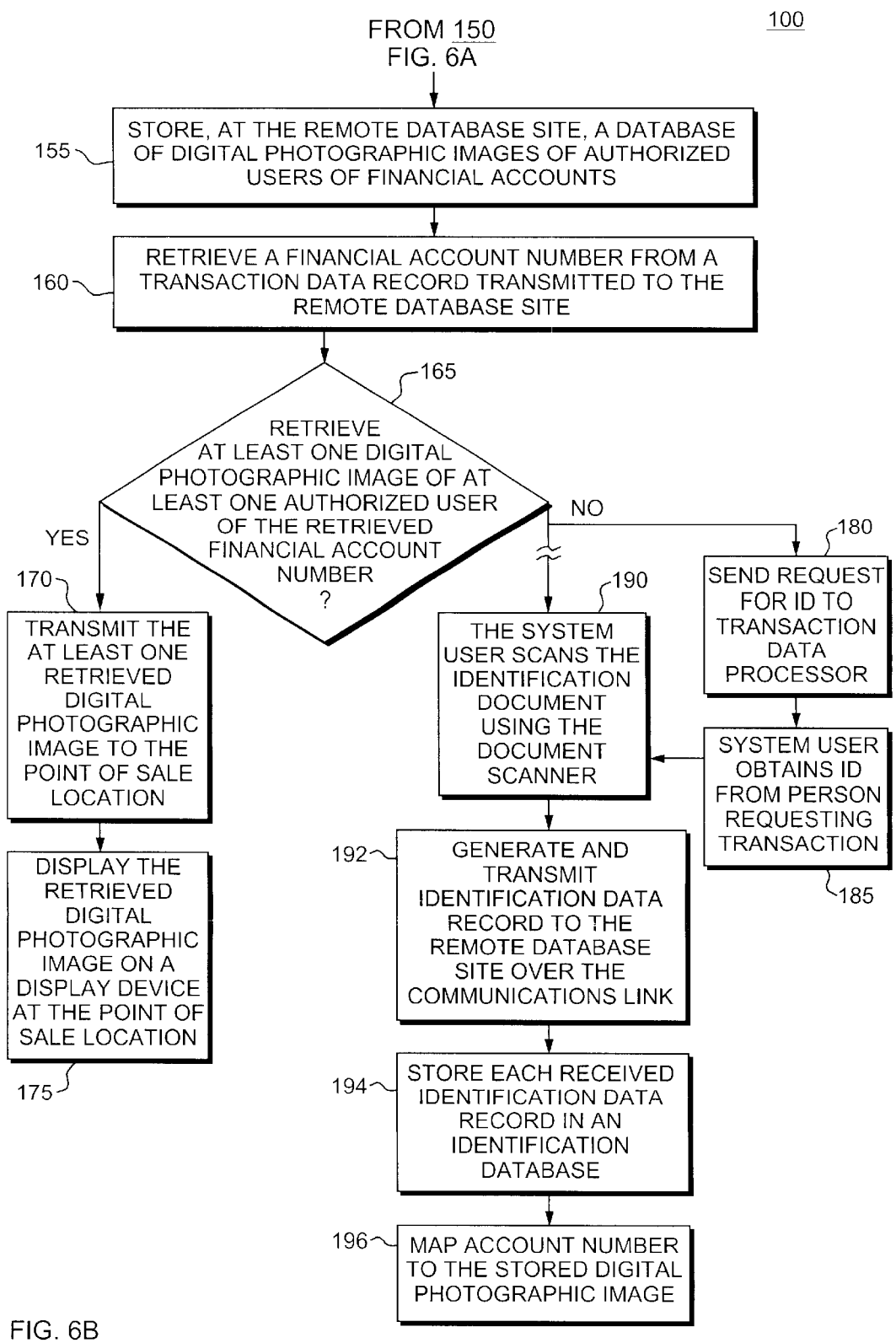

FIGS. 6A and 6B show a method 100 of processing transaction data, which, in one embodiment, especially tailored to facilitate the capture, storage and retrieval of financial transaction data, including digital representations of signatures of persons initiating financial transactions. Method 100 begins by scanning a document related to a transaction, step 110. The document scanned includes at least a signature of a person initiating a transaction, such as a non-cash financial instrument-initiated financial transaction (e.g. a credit card or the like). Next, in step 120, the scanned transaction data is processed using a transaction data processor to generate a transaction data record. The transaction data processor is then linked with at least one remote database site, step 130.

In step 140, the transaction data record generated by the transaction data processor is transmitted to the remote database site. Then, in step 150, each transaction data record received at the remote database site is stored in a transaction data record database.

In alternative embodiments, the method further includes providing financial transaction data from a point of sale system to the transaction data processor. The transaction data processor then merges the data received from the point of sale system with the data scanned from the document related to the financial transaction. The method 100 may also include retrieving a stored transaction data record from the transaction data record database at the request of a system user. Such a request could be made either manually by contacting the transaction database provider via telephone or in writing. However, the invention also contemplates electronic information requests, which can be initiated by a merchant using the transaction data processing system of the present invention. Such an information request could be generated using a software module integrated into an existing-computer-based point of sale system. When requesting the retrieval of a transaction data record, such a retrieved record would be transmitted from the remote database site to the point of sale location where it could be displayed on a display device and printed using a printer incorporated into the point of sale system. In this manner, should a "request for copy" be made to a merchant by a credit card processor or the like, the merchant could readily obtain a printed receipt, including the signature of the person initiating the financial transaction.

As indicated earlier, the method could also include encrypting transaction data records prior to transmitting them between the point of sale location and the remote database site. Additionally, the transaction data records may be compressed prior to transmission and stored at the transaction database site in a compressed state. They may further be decompressed and stored in a decompressed state in the remote transaction record database.

Digitally signed data elements may also be attached to each transaction data record prior to transmitting the same to the remote database site. This would allow each transaction data record to be checked for origin and authenticity at the remote database site or at the point of sale location should a particular transaction data record be retrieved from the remote database site and provided to the point of sale location.

In the embodiment described above, wherein the transaction data processing system 1 of the present invention is utilized in conjunction with a positive identification system, such as the system disclosed in the '389 Patent, the method 100 of processing transaction data would further include the steps of: storing at the remote database site a database of digital photographic images of authorized users of financial accounts, step 155 (FIG. 6B); retrieving a financial account number from a transaction data record transmitted to the remote database site, step 160; retrieving at least one digital photographic image of at least one authorized user of the retrieved financial account number, step 165; transmitting the at least one retrieved digital photographic image to the point of sale location, step 170; and displaying the retrieved digital photographic image on a display device at the point of sale location, step 175. In this manner, the identity of the person initiating the financial transaction could be positively identified, thereby further reducing the probability that fraud is being committed upon a merchant at a point of sale location.

In the situation where an individual initiates a financial transaction using a non-cash financial instrument and a digital photographic image of at least one authorized user of the account associated with the instrument cannot be retrieved from the digital photographic image database, then, in step 180, a request for identification information is sent to the transaction data processor from the remote database site. The information request prompts a system user to obtain an identification document from the person initiating the transaction, step 185. In the preferred embodiment, the identification document includes a photographic image of the person initiating the transaction.

Then, in step 190, the system user scans the identification document using the document scanner. An identification data record is then generated by the transaction data processor and is transmitted to the remote database site over the communications link, step 192. Of course, encryption and compression systems and methods may be used here, too, in order to speed the transfer of information and ensure the security of the transmitted information.

At the remote database site, each received identification data record is stored in an identification database, step 194. In the preferred embodiment, where the identification data record includes a digitized photographic image of the person initiating the transaction, the front end server at the remote database site would further process the identification data record to obtain the digital photographic image, which it would write to the digital photographic image database for storage. Finally, in step 196, the account number used to initiate the transaction would be mapped to the stored digital photographic image so that the person's image can be retrieved upon subsequent transactions initiated using the account mapped to the image.

Accordingly, the disclosed system and method offers the following advantages over current signature capture systems. First, it allows a patron to sign a receipt with a normal pen either on a counter at the point of sale location or remotely without effecting human factors. This would provide better customer satisfaction by maintaining an existing point of sale paradigm. In addition, valuable counter space would not be taken up by a separate signature capture pad that would be needed by prior art signature capture systems to capture the signature of a patron. Furthermore, a scan of a transaction document would only take a few seconds, shaving valuable seconds off of the time to complete a transaction.

In one embodiment, the scanned data could contain all the information needed to prove the transaction took place, as opposed to having to take a raw signature and marry it up with data received from disparate sources such as a point of sale system. Thus, the present invention could be utilized by merchants having less sophisticated point of sale systems. Of course, a more sophisticated embodiment of the invention could be utilized in connection with more sophisticated point of sale systems.

Additionally, by being removed from the traffic area of a point of sale location, the scanner of the present invention would be much less likely to be damaged than a signature pad that would be required to be placed in a high traffic area. Thus, the disclosed system would have a much higher reliability than prior art signature capture systems. Another significant advantage of the present system is that a single device can optionally be used to capture additional data, such as photo ID data, demographic information, and other images such that the disclosed system can be used in fraud prevention and processing efficiency efforts. Finally, the disclosed system and method makes it easy to capture the signature and other data of a patron when the patron is remote from the clerk, such as at a drive up window, safety glass station or the like.

Modifications and substitutions by one of ordinary skill in the art are considered to be within the scope of the present invention which is not to be limited except by the claims which follow.

What is claimed is:

1. A transaction data processing system, especially configured to capture, store and retrieve transaction data, including a digital representation of a signature of a person initiating a transaction, said data processing system comprising:

a transaction data scanner located at a point of use location, said scanner configured to scan a transaction document, said transaction document including transaction data including at least a signature of said person initiating said transaction;

a transaction data processor for processing said scanned transaction data into a data transaction record;

a remote database site having stored therein a database including said transaction data records;

a communications link, linking said transaction data processor and said remote database site; and a display device at said point of use location for displaying information scanned by said scanner and information transmitted from said remote database site to said point of use location, wherein said remote database site further includes a database of digital photographic images of authorized users of financial accounts and a database processor for retrieving a financial account number from a transaction data record transmitted to said remote database site, retrieving at least one digital photographic image of at least one authorized user of said retrieved financial account number and for transmitting said at least one retrieved digital photographic image to said display device at said point of sale location.

2. A method of processing transaction data, especially tailored to facilitate the capture, storage and retrieval of transaction data, including a digital representation of a signature of a person initiating a transaction, at a point of use, said method comprising the steps of:

scanning a document related to a transaction, said document including transaction data including a signature of a person initiating said transaction;

processing at least said scanned transaction data and generating a transaction data record;

linking said transaction data processor with at least one remote database site;

transmitting said transaction data record generated by said transaction data processor to said remote database site; and storing each transaction data record received at said remote database site in a transaction data record database;

storing, at said remote database site a database of digital photographic images of authorized users of financial accounts;

retrieving a financial account number from a transaction data record transmitted to said remote database site;

retrieving at least one digital photographic image of at least one authorized user of said retrieved financial account number;

transmitting said at least one retrieved digital photographic image to said point of sale location; and displaying said retrieved digital photographic image on a display device at said point of use.

3. The method of claim 2 further comprising the steps of:

sending a request for identification information to said transaction data processor if no digital photographic images of at least one authorized user of said financial account number is retrieved;

scanning an identification document using said document scanner;

generating an identification data record at said transaction data processor;

transmitting said identification data record to said remote database site; and storing said identification data in an identification database.

4. The method of claim 3, wherein said identification document includes a digital photographic image of said person initiating said transaction, said method further comprising the steps of:

processing said identification data and storing said digital photographic image in said digital photographic image database; and mapping said stored image to said financial account number.

* * * * *